United States Patent Office 3,600,186
Patented Aug. 17, 1971

3,600,186
LOW CALORIE FAT-CONTAINING
FOOD COMPOSITIONS
Fred H. Mattson, Mount Healthy, and Robert A. Volpenhein, Green Township, Hamilton County, Ohio, assignors to The Procter & Gamble Company, Cincinnati, Ohio
No Drawing. Filed Apr. 23, 1968, Ser. No. 723,607
Int. Cl. A23l 1/00; A21d 2/16, 13/06
U.S. Cl. 99—1                                  6 Claims

ABSTRACT OF THE DISCLOSURE

Low calorie food compositions are produced by replacing at least a portion of the fat content of a conventional food with a sugar fatty acid ester or sugar alcohol fatty acid ester having at least 4 fatty acid ester groups with each fatty acid having from 8 to 22 carbon atoms.

BACKGROUND OF THE INVENTION

The field of this invention is food compositions. More specifically, the invention relates to novel fat-containing food compositions where the fat or a portion thereof comprises certain compounds which have the physical properties of ordinary triglyceride fat but which are comparatively less digested or absorbed and thus are relatively low in available calories. One of the most common metabolic problems among people today is obesity. This condition is simply due to a greater intake of calories than are expended. Fat is the most concentrated form of energy in the diet, with each gram of fat supplying approximately 9 calories. Overall, fat constitutes about 40% of the total calories in the diet. If the available calories of a fat could be lowered without decrease in the amount eaten, this would offer a very convenient and practical method by which obesity could be prevented or overcome.

Triglycerides are the main component of edible fat and constitute 90% of the total amount consumed. One method by which the caloric value of edible fat could be lowered would be to decrease the amount of triglyceride that is absorbed in the human system since the usual edible triglyceride fats are almost completely absorbed (see Lipids, 2, H. J. Deuel, Interscience Publishers, Inc., New York 1955, page 215).

The absorbability of triglyceride fat could be decreased by altering either the alcohol or the fatty acid portion of the molecule. There have been some experiments that have demonstrated a decrease in absorbability with certain fatty acids; for example, erucic acid (H. J. Deuel, A.L.S. Cheng, and M. G. Morehouse, Journal Nutrition 35, 295 [1948]) and stearic acid if present as tristearin (F. H. Mattson, Journal of Nutrition 69, 338 [1959]). However, with one exception, no attempt to accomplish this end (decreased absorbability) has been made by altering the alcohol moiety of edible fatty compounds, i.e., fatty acid esters of alcohols. The one exception is U.S. Patent 2,962,419, November 29, 1960, which discloses that fatty acid esters which contain a neopentyl

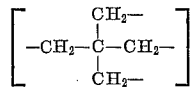

nucleus are not digested like normal fats and thus can be used as a fat substitute in food compositions.

One of the main problems in attempting to formulate fat compounds that have decreased absorbability and thus low calorie properties is to maintain the desirable and conventional physical properties of edible fat. Thus, to be a practical low calorie fat, a compound must resemble conventional triglyceride fat, and have the same utility in various fat-containing food compositions such as shortening, margarine, cake mixes, and the like, and be useful in frying or baking.

SUMMARY OF THE INVENTION

In accordance with the present invention, it has been discovered that certain fatty acid ester compounds having at least 4 fatty acid ester groups have the physical properties of ordinary triglyceride fat but are not digested or absorbed to the same extent when eaten. These compounds can therefore be used as a partial or total replacement for ordinary triglyceride fat in fat-containing food compositions to reduce the caloric value thereof. More specifically, the invention provides a low calorie fat-containing food composition wherein from about 10% to about 100% of the total fat comprises a sugar or sugar alcohol fatty acid ester having at least 4 fatty acid ester groups, each fatty acid having from about 8 to about 22 carbon atoms.

The above defined fat-containing food compositions have equivalent physical properties and palatability compared to similar compositions which contain normal triglyceride fat but they have a substantially lower effective caloric value because the specified sugar or sugar alcohol fatty acid esters are less digested or absorbed than normal triglyceride fat in the intestinal tract and hence not all of the ingested calories are available to the body. The sugar or sugar alcohol compounds per se and food compositions containing these compounds which are low in available calories are conveniently referred to herein simply as "low calorie."

DESCRIPTION OF THE PREFERRED EMBODIMENTS.—(LOW CALORIE FAT MATERIALS)

The low calorie fat materials of the present invention are sugar or sugar alcohol fatty acid esters. The term "sugar" is used herein in its conventional sense as generic to mono- and disaccharides. The term "sugar alcohol" is also used in its conventional sense as generic to the reduction product of sugars wherein the aldehyde or ketone group has been reduced to an alcohol. The fatty acid ester compounds are prepared by reacting a monosaccharide, disaccharide or sugar alcohol with fatty acid as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e., erythritol, contains 4 hydroxyl groups and is thus suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups.

Preferred compounds for use as the alcohol moiety in the low calorie fats of the present invention are selected from the group consisting of erythritol, xylitol, sorbitol, glucose and sucrose.

In preparing the low calorie fats of the present invention at least 4 hydroxyl groups of a sugar or sugar alcohol compound such as those identified above must be esterified with a fatty acid having from about 8 to about 22 carbon atoms. Examples of such fatty acids are caprylic, capric, lauric, myristic, myristoleic, palmitic, palmitoleic, stearic, oleic, ricinoleic, linoleic, linolenic, eleostearic, arachidic, behenic, and erucic. The fatty acids can be derived from sutiable naturally occurring or synthetic fatty acids and can be saturated or unsaturated, including positional and geometric isomers, depending on the desired physical properties, e.g., liquid or solid, of the fat compound.

Fatty acids per se or naturally occurring fats and oils can serve as the source for the fatty acid component in the sugar or sugar alcohol fatty acid ester. For example, rapeseed oil provides a good source for $C_{22}$ fatty acid. $C_{16}$–$C_{18}$ fatty acid can be provided by tallow, soybean oil, or cottonseed oil. Shorter chain fatty acids can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. Among the fatty acids, those that are preferred have from about 14 to about 18 carbon atoms, and are most preferably selected from the group consisting of myristic, palmitic, stearic, oleic, and linoleic. Thus, natural fats and oils which have a high content of these fatty acids represent preferred sources for the fatty acid components, e.g., soybean oil, olive oil, cottonseed oil, corn oil, tallow and lard.

The sugar or sugar alcohol fatty acid esters suitable for use in this invention can be prepared by a variety of methods well known to those skilled in the art. These methods include: transesterification with another ester such as methyl, ethyl or glycerol, acylation with a fatty acid chloride; acylation with a fatty acid anhydride, and acylation with a fatty acid per se. Further details for making sugar or sugar alcohol fatty acid esters are described in U.S. Patent 2,831,854.

A characterizing feature of the sugar or sugar alcohol fatty acid esters useful in this invention is that they must contain at least 4 fatty acid ester groups. Sugar or sugar alcohol fatty acid ester compounds that contain 3 or less fatty acid ester groups are digested in the intestinal tract much in the manner as ordinary triglyceride fats, but it has been discovered that sugar or sugar alcohol fatty acid ester compounds that contain four or more fatty acid ester groups are digested to a lesser extent and thus have the desired low calories properties for use in this invention. It is not necessary that all of the hydroxyl groups of the sugar or sugar alcohol compound be esterified with fatty acid but it is preferable that the compound contain no more than 2 unesterified hydroxyl groups. Most preferably, all of the hydroxyl groups of the sugar or sugar alcohol are esterified with fatty acid, i.e., the compound is substantially completely esterified. The fatty acid ester groups can be the same or mixed on the same sugar or sugar alcohol molecule.

Thus, to illustrate the above points, sucrose triester of fatty acid would not be suitable for use herein because it does not contain the required 4 fatty acid ester groups. Sucrose tetra fatty acid ester would be suitable but is not preferred because it has more than 2 unesterified hydroxyl groups. Sucrose hexa fatty acid ester would be preferred because it has no more than 2 unesterified hydroxyl groups. An example of a highly preferred compound in which all of the hydroxyl groups are esterified with fatty acid is sucrose octa fatty acid ester. In any given sugar or sugar alcohol fatty acid ester compound the fatty acid ester groups can be selected in view of the desired physical properties of the compound. The sugar or sugar alcohol compounds which contain unsaturated fatty acid ester groups and/or a preponderance of short chain, e.g., $<C_{14}$, fatty acid ester groups are generally liquid at room temperature. The sugar or sugar alcohol compounds which contain long chain fatty acid ester groups, e.g., $>C_{14}$, or are saturated, e.g., stearoyl, are generally solids at room temperatures. Thus, if it is desired to have a liquid low calorie fat, e.g., for use as a salad oil, the sugar or sugar alcohol fatty acid ester can be based on unsaturated fatty acid ester groups such as oleic acid, or can be derived from suitable liquid or partially hydrogenated oils such as soybean oil or olive oil. If it is desired to have a sugar or sugar alcohol fatty acid ester solid at room temperature, the fatty acid ester groups can be saturated, or derived from normally solid fat such as tallow, lard or substantially completely hydrogenated soybean oil.

The following are examples of suitable sugar or sugar alcohol fatty acid esters containing at least 4 fatty acid ester groups suitable for use as low calorie fats in the present invention. Glucose tetraoleate, glucose tetrastearate, glucose tetraester of soybean oil fatty acid, mannose tetraester of tallow fatty acid, galactose tetraester of olive oil fatty acid, aribinose tetraester of cottonseed oil fatty acid, xylose tetralinoleate, galactose pentastearate, sorbitol tetraoleate, sorbitol hexaester of olive oil fatty acid, xylitol pentapalmitate, xylitol tetraester of substantially completely hydrogenated cottonseed oil fatty acid, sucrose tetrastearate, sucrose pentastearate, sucrose hexaoleate, sucrose octaoleate, sucrose octaester of substantially completely hydrogenated soybean oil fatty acid, sucrose octaester of peanut oil fatty acid. As noted before, highly preferred sugar or alcohol fatty acid esters are those wherein the fatty acids contain from about 14 to about 18 carbon atoms and are thus derived from such natural materials as soybean oil and olive oil. Examples of such compounds are erythritol tetraester of olive oil fatty acid, erythritol tetraoleate, xylitol pentaoleate, sorbitol hexaoleate, sucrose octaoleate, and sucrose octaester of soybean oil fatty acid.

The low calorie property of the sugar or sugar alcohol fatty acid ester fats of the present invention is shown below by a fat balance experiment from which a coefficient of absorbability is obtained. This is a conventional experiment in which rats are fed a dietary fat comprising the test material and their feces are collected. The amount of fat eaten and the amount of fat in the feces are determined. The difference between these two values is the amount of fat absorbed. The portion absorbed of the amount fed expressed as a percentage is the coefficient of absorbability and is an indication of the relative available calories of the test materials.

Four low calorie sugar and sugar alcohol fatty acid ester fats of this invention were prepared for this experiment: erythritol tetraoleate; xylitol pentaoleate; sorbitol hexaoleate; and sucrose octaoleate. These compounds were compared with fatty materials containing less than 4 fatty acid ester groups, i.e., with methyl oleate and ethylene glycol dioleate, and with a conventional triglyceride fat, i.e., triolein. The low calorie sugar alcohol fatty acid esters were prepared in the following manner:

Erythritol tetraoleate.—Erythritol and a five-fold excess of ethyl oleate was heated under vacuum during mechanical agitation, in the presence of sodium methoxide catalyst (xylene suspension) over two several hour periods at about 180° C. The reaction product (erythritol tetraoleate) was refined in petroleum ether and crystallized three times from several volumes of acetone at 34° F.

Xylitol pentaoleate.—Xylitol and a five-fold excess of ethyl oleate in dimethyl acid amide (DMAC) solution were heated in the presence of sodium methoxide catalyst (xylene suspension) during mechanical agitation under vacuum over a 5-hour period of about 180° C. During this time the DMCA was distilled off. The product (xylitol pentaoleate) was refined in petroleum ether solution and, after being freed of petroleum ether solution, was separated as a liquid layer four times from acetone at 34° F. and twice from alcohol at 50° F.

Sorbitol hexaoleate was prepared by essentially the same procedure used to prepare xylitol pentaoleate except that sorbitol was substituted for xylitol.

Sucrose octaoleate was also prepared by essentially the same procedure as that used to prepare xylitol pentaoleate except that sucrose was substituted for xylitol.

FAT BALANCE EXPERIMENT

The experimental diet fed to the rats had the composition shown in Table I.

TABLE I (DIET)

| Ingredient: | Weight percent |
|---|---|
| Casein, V.F. | 27.0 |
| Sucrose | 46.0 |
| Water-soluble vitamins in sucrose No. 18 | 5.0 |
| Salt mixture USP XIV | 4.0 |
| Cellu flour | 3.0 |
| Fat | 15.0 |

(Procedure)

Young adult, male, Sprague-Dawley rats were randomly assigned into groups of eight animals each. The animals were housed in individual cages and offered feed and water ad libitum. As noted above, the experimental diet contained 15% fat. 10%, 25%, or 100% of this dietary fat was the test material while the remainder was triolein. The rats were fed the experimental diet during a 5-day orientation period. Throughout the following ten days, food consumption was measured and feces were collected. After collection, the feces were dried to a constant weight, cleaned of hair, weighed and ground. The feces were then submitted for total fatty acid determination by the Saponification Procedure. (See Hoagland, R. and Snider, G. G., U.S.D.A. Technical Bulletin No. 821, March 1942.) Coefficients of absorbability were then calculated. These values were analyzed statistically by an analysis of variance and the Tukey F test.

Because of the large number of dietary fats, it was not possible to feed all fats at the same time. Thus the experiment was carried out in three successive phases. During the first phase, the dietary fat comprising 10% of the test material was fed, in the next phase dietary fat comprising 25% of the test material was fed, and in the final phase, the dietary fat comprised 100% of the test material. Since a group of animals whose dietary fat was solely triolein was used in each phase of the experiment, comparisons among all groups could be made.

(Results)

The coefficients of absorbability of the various dietary fats are given in Table II.

TABLE II
Observed coefficient of absorbability of dietary fats containing triolein plus test materials

| Test Material | Level of test material in dietary fat (balance is triolein) | | |
|---|---|---|---|
| | 10% | 25% | 100% |
| Normal triglyceride fat: Triolein | 97 | 96 | 96 |
| Comparative fats: | | | |
|   Methyl oleate | 96 | 96 | 79 |
|   Ethylene glycol dioleate | 96 | 95 | 87 |
| Low calorie fats: | | | |
|   Erythritol tetraoleate | (¹) | 90 | 68 |
|   Xylitol pentaoleate | 91 | 78 | 53 |
|   Sorbitol hexaoleate | 86 | 70 | 50 |
|   Sucrose octaoleate | 86 | 77 | 61 |

¹ Not measured.

None of the test materials when they were the sole dietary fat, was as well absorbed as triolein. The addition to triolein of a test material that comprised a sugar or sugar alcohol fatty acid ester having at least 4 fatty acid groups resulted in a decrease in the amount of total fat that was absorbed. This decrease in absorption was related to the level of test material in the total dietary fat. Assuming that the presence of esters of other alcohols, i.e., the test materials, does not alter the absorption of triolein, the absorbability of the test materials per se at each level of total dietary fat was then calculated by the following formula:

Observed coefficient of absorbability
$$\frac{-(\text{percent of triolein in total dietary fat} \times 96\%)}{\text{Percent of test material in total dietary fat}}$$

The results of these calculations are given in Table III.

TABLE III
Calculated coefficients of absorbability of test materials

| Test Fat | Level of test material in dietary fat (balance is triolein) | | |
|---|---|---|---|
| | 10% | 25% | 100% |
| Normal triglyceride fat: Triolein | 97 | 96 | 96 |
| Comparative fats: | | | |
|   Methyl oleate | 100 | 96 | 79 |
|   Ethylene glycol dioleate | 100 | 92 | 87 |
| Low calorie fats: | | | |
|   Erythritol tetraoleate | | 72 | 68 |
|   Xylitol pentaoleate | 50 | 24 | 53 |
|   Sorbitol hexaoleate | 0 | 0 | 50 |
|   Sucrose octaoleate | 0 | 20 | 61 |

The data in Table III show that as the number of ester groups increase there was a decrease in absorbability. The comparative fats which contained 1 or 2 ester groups were absorbed much like triolein, which contains 3 ester groups. The sugar or sugar alcohol fatty acid esters which contained 4 or more hydroxyl groups were significantly less absorbed. The assumption stated above upon which these calculations were based was confirmed in tests with thoracic, duct cannulated rats using labeled fats. Further, the data of Table III indicate that the xylitol, sorbitol and sucrose esters were better absorbed when they were the sole dietary fat. This observation is consistent with a proposed mechanism which indicates that these compounds compete with the triolein for a single digestive enzyme. The possible mechanism wherein these compounds engage in competition for a common enzyme can be tested by studying hydrolysis of the compounds in vitro. In any event, regardless of the mechanism that is operable, the results obtained in this experiment clearly show that the addition to the diet of a fat comprising a sugar or sugar alcohol fatty acid ester containing at least 4 fatty acid ester groups will result in a decrease in the amount of fat that is absorbed. Thus, these particular fats can be said to be low calorie.

The low calorie sugar or sugar alcohol fatty acid esters of the present invention can be used as a partial or total replacement for normal triglyceride fat in any fat-containing food composition to provide low calorie benefits. In order to obtain a significant low calorie effect, it is necessary that at least about 10% of the fat in the food composition comprises the low calorie sugar or sugar alcohol fatty acid ester. On the other hand, very low calorie and thus highly desirable food compositions of the invention are obtained when the fat comprises up to about 100% of the sugar or sugar alcohol fatty acid ester. Hence, the low calorie fats of the present invention can be used as a partial or complete replacement for normal triglyceride fat in a salad or cooking oil, or a plastic shortening, for use in frying, cake making, bread making, or the like. The low calorie fats can also be used as a partial or complete replacement for normal triglyceride fat in fat-containing food products such as mayonnaise, margarine, and dairy products.

In order to more particularly illustrate the food composition utility of the low calorie fats of the present invention, erythritol tetraester of olive oil fatty acid (ETOFA) was prepared by the following transesterification reaction: Erythritol and distilled and refined ethyl esters of olive oil (100% excess) were mixed with mechanical agitation under vacuum in the presence of sodium methoxide catalyst (xylene suspension) for 14 hours at 100°–180° C. The reaction product was mixed with water and taken up in petroleum ether. After washing to neutrality with aqueous alcohol and water, the petroleum ether was evaporated and the product (ETOFA) was crystallized four times from ten volumes of acetone at 0° to −10° C. After the last crystallization, the ETOFA was steam deodorized for one hour at about 160° C. to provide a final product having Analytical Data of A.V.—0.1, H.V.—2, TFA—96.6, and TLC—1.0% ethyl ester. The ETOFA was a liquid at room temperature that resembled conventional salad oil in appearance and feel. It was slightly more viscous than conventional salad oil.

ETOFA was shown to function as a typical salad or cooking oil in the following tests, in which it was compared to a conventional commercially available salad oil comprised of refined and lightly hydrogenated soybean oil:

Smoke point.—The smoke point of ETOFA was compared to that of the conventional oil. The ETOFA had a smoke point of about 398° F. as compared to 466° F. for the conventional oil.

Pan frying tests.—Two electric Teflon-coated 10-inch skillets were used for these tests. 200 grams of oil was added to the skillet for the fish and meat test. 30 grams of oil was added for the egg frying test. Temperature for frying was that recommended by the skillet manufacturer for each type of food. ETOFA performed satisfactorily in each of the pan frying tests. Slightly more spattering was observed with the ETOFA than with the conventional oil but it was not deemed excessive.

Eggs—no differences in color or flavor could be detected between the eggs fried in ETOFA and those fried in the conventional oil.

Beefsteaks—ETOFA performed as well as the conventional oil. No differences in color or flavor were detected.

Breaded shrimp—the products fried in ETOFA appeared similar to those fried in conventional oil and were acceptable to a taste panel.

Breaded codfish steaks—ETOFA performed as well as the conventional oil. 66% of a taste panel could not detect any differences. The remaining panelists were split 50/50 among the oil as to preference.

Deep fat frying.—Potato pieces were fried at 375° F. in ETOFA and conventional oil. The ETOFA functioned satisfactorily as a deep frying oil. Panelists judged the products fried in the conventional oil to have a slightly better flavor and color.

Cakes.—High ratio white cakes were prepared using ETOFA, the conventional salad oil, or cottonseed oil as the shortening base. To each base oil was added an emulsification system comprising 14% propylene glycol monostearate and 2.0% stearic acid. (See U.S. Patent 3,145,108.) The cakes had the following formula:

| Ingredient: | Weight (grams) |
|---|---|
| Sugar | 133 |
| Flour | 107 |
| Shortening | 47.5 |
| Double-acting baking powder | 6.7 |
| Milk | 130 |
| Egg whites | 60 |
| Vanilla | 2.5 |

Examination of the cakes indicated that those utilizing ETOFA as a shortening base were substantially equivalent to those based on conventional soybean salad oil or cottonseed oil.

Bread.—ETOFA was substituted for conventional vegetable shortening in normal white bread at an equal weight. Bread prepared with the conventional vegetable shortening was run as a control. The experimental dough containing the ETOFA was very similar to the control in dough handling properties and firming rate of the finished products. The results of a taste panel indicated that there was very little difference in flavor detected with the ETOFA as compared to the vegetable shortening-based bread. The bread formula was as follows:

| Ingredient: | Weight (grams) |
|---|---|
| Flour | 808 |
| Wheat starch | 146 |
| Water | 566 |
| Yeast (dry) | 35 |
| Shortening | 58 |
| Sucrose | 55 |
| Nonfat milk solids | 38 |
| Salt | 25 |

Mayonnaise.—ETOFA, conventional soybean salad oil, and cottonseed oil, were compared in a conventional mayonnaise recipe of the following formula:

| Ingredient: | Percent by weight |
|---|---|
| Egg yolk | 8.0 |
| Vinegar | 11.0 |
| Sugar | 2.0 |
| Salt | 1.3 |
| Oil | 77.7 |

The ETOFA produced a mayonnaise but it had a slightly more oily taste when compared to that prepared with cottonseed or soybean oil.

Plastic shortening.—100 gram samples of commercially available conventional plastic shortening, ETOFA, and ETOFA+10% hardstock (tristearin) were each melted and plasticized using a laboratory chiller. All samples formed plastic fats.

EXAMPLES

The following examples illustrate low calorie fat-containing food compositions wherein from about 10% to about 100% of the fat comprises a sugar or sugar alcohol fatty acid ester of the present invention.

Example 1.—Salad oils (A)

| Ingredients: | Percent by weight |
|---|---|
| Refined, bleached, and lightly hydrogenated soybean oil | 50 |
| Sucrose octaester of soybean oil fatty acid | 50 |
| | 100 |

(B)

| | |
|---|---|
| Refined cottonseed oil | 90.0 |
| Sorbitol pentaoleate | 10.0 |
| | 100.00 |

(C)

| | |
|---|---|
| Sucrose octaoleate | 100 |

(D)

| | |
|---|---|
| Erythritol tetraester of olive oil fatty acid | 100 |

(E)

| | |
|---|---|
| 50/50 blend of cottonseed oil and soybean oil | 50 |
| Olive oil | 25 |
| Erythritol tetraester of olive oil fatty acid | 25 |
| | 100 |

Example 2.—Plastic shortening (A)

| | Percent by weight |
|---|---|
| Lightly hydrogenated soybean oil (I.V. 107) | 50 |
| Xylitol pentaoleate | 40 |
| Tristearin (hardstock, I.V. 8) | 10 |
| | 100 |

(B)

| | |
|---|---|
| 50/50 mixture of hardened cottonseed oil and lard | 40 |
| Monoglycerides of soybean oil | 10 |
| Sucrose octastearate | 50 |
| | 100 |

(C)

| | Percent by weight |
|---|---|
| Glucose octaester of tallow fatty acid | 100 |

Example 3.—Prepared cake mix (a) Specific:

| | |
|---|---|
| Cake flour | 36 |
| Sugar | 44 |
| Shortening (sorbitol hexastearate) | 13 |
| Nonfat dried milk solids | 4 |
| Leavening | 2 |
| Salt | 1 |
| | 100 |

(b) General:

| | |
|---|---|
| Sugar | 35–50 |
| Flour | 25–50 |
| Shortening (10%–100% sugar or sugar alcohol fatty acid ester) | 5–30 |
| Leavening | 1–4 |
| Cocoa | 0–7 |
| Egg | 0–5 |
| Milk solids | 0–5 |
| Flavor | 0–5 |
| | 100 |

Example 4.—Prepared icing mix

| | |
|---|---|
| Shortening (50/50 mixture conventional vegetable shortening and erythritol tetraoleate) | 20 |
| Salt | 2 |
| Nonfat dry milk solids | 5 |
| Sugar | 73 |
| | 100 |

Example 5.—Mayonnaise

| | |
|---|---|
| Fat (75:25 blend of erythritol tetraester of olive oil fatty acid, and refined cottonseed oil) | 75 |
| Vinegar | 10 |
| Egg yolk | 9 |
| Sugar | 3 |
| Salt | 1 |
| Mustard | 1 |
| Flavor | 1 |
| | 100 |

Example 6.—Salad dressing

| | |
|---|---|
| Fat (xylitol pentaoleate) | 50 |
| Cornstarch | 5 |
| Vinegar | 10 |
| Water | 35 |
| | 100 |

Example 7.—Margarine

| | Percent by weight |
|---|---|
| Oil (sucrose octaoleate) | 80 |
| Milk solids | 2 |
| Salt | 2 |
| Monoglyceride | 15 |
| Water | 1 |
| | 100 |

As exemplified above, a wide variety of low calorie fat-containing food compositions can be prepared from the sugar and sugar alcohol esters disclosed herein. Preferred food compositions are those selected from the group consisting of salad oil, plastic shortening, bread, prepared culinary mixes (e.g., for cakes, icings, and the like), mayonnaise, and margarine.

We claim:

1. A low calorie fat-containing food composition comprising non-fat ingredients and fat ingredients wherein from about 10% to about 100% of the total fat consists essentially of a sugar fatty acid ester having at least 4 fatty acid ester groups, each fatty acid having from about 8 to about 22 carbon atoms.

2. The composition of claim 1 wherein the sugar fatty acid ester contains no more than 2 unesterified hydroxyl groups.

3. The composition of claim 2 wherein the sugar fatty acid ester is completely esterified.

4. The composition of claim 3 wherein each fatty acid has from about 14 to about 18 carbon atoms.

5. A low calorie fat-containing food composition comprising non-fat ingredients and fat ingredients wherein from about 10% to about 100% of the total fat comprises a sugar fatty acid ester compound or a sugar alcohol fatty acid ester compound wherein the compound is completely esterified, said compound having at least 4 fatty acid ester groups and each fatty acid having from 8 to 22 carbon atoms.

6. The composition of claim 5 wherein each fatty acid group has from 14 to 18 carbon atoms.

References Cited

UNITED STATES PATENTS

| 2,831,854 | 4/1958 | Tucker et al. | 260—234 |
| 2,997,492 | 8/1961 | Martin | 99—92X |
| 2,997,493 | 8/1961 | Huber | 99—92X |

RAYMOND N. JONES, Primary Examiner

J. R. HOFFMAN, Assistant Examiner

U.S. Cl. X.R.

99—90, 92, 94, 118, 122, 139, 144